United States Patent [19]
Haschberger et al.

[11] Patent Number: 6,147,762
[45] Date of Patent: Nov. 14, 2000

[54] METHOD OF SPECTROSCOPIC INVESTIGATION OF ELECTROMAGNETIC RADIATION BY MEANS OF A FOURIER SPECTROMETER

[75] Inventors: Peter Haschberger, Gauting, Germany; Nicholas King, Middlesex, United Kingdom; Erwin Lindermeir, Munich, Germany

[73] Assignee: Deutsches Zentrum fur Luft - und Raumfahrt E.V., Bonn, Germany

[21] Appl. No.: 09/320,705

[22] Filed: May 27, 1999

[30] Foreign Application Priority Data

May 29, 1998 [DE] Germany ............................. 198 24 277

[51] Int. Cl.[7] ...................................................... G01B 9/02
[52] U.S. Cl. ............................................ 356/451; 356/456
[58] Field of Search ...................................... 356/346, 345

[56] References Cited

U.S. PATENT DOCUMENTS 4,927,269  5/1990  Keens et al. .

OTHER PUBLICATIONS

Li et al., "Peak Torque Reduction with Redundant Manipulators", International Conference on Robotics and Automation, pp. 1775–1780, (1996).

Schlemmer, "On–Line Trajectory Optimization for Kinematically Redundant Robot–Manipulator and Avoidance of Moving Obstacles", International Conference on Robotics and Automation, pp. 474–479, (1996).

Shugen, "A Stabilized Local Torque Optimization Technique for Redundant Manipulators", International Conference on Robotics and Automation, pp. 2791–2796, (1995).

Hu et al., "Relation Between Global Velocity and Local Torque Optimization of Redundant Manipulators" *Journal of Robotic Systems*, vol. 11, No. 4, pp. 271–279 (1994).

*Primary Examiner*—Robert Kim
*Attorney, Agent, or Firm*—Browdy And Neimark

[57] ABSTRACT

The correction method of the invention synthesizes a distortion-free interferogram (or spectrum) from a measured interferogram, which has been distorted by detector non-linearities, and a finite series of orthogonal functions derived therefrom. The coefficients of the series of functions are selected with a priori knowledge about the limited spectral sensitivity of the radiation detector, preferably with the method of Gaussian least squares fit of observation, such that the resulting spectrum assumes the value of zero of the distortion-free spectrum outside of the sensitivity range, and in freely-definable ranges. The method of the invention can be used to correct detector non-linearities, as occur in Fourier spectroscopy.

15 Claims, 2 Drawing Sheets

METHOD OF SPECTROSCOPIC INVESTIGATION OF ELECTROMAGNETIC RADIATION BY MEANS OF A FOURIER SPECTROMETER

FIELD OF THE INVENTION

The invention relates to a method of spectroscopic investigation of electromagnetic radiation by means of Fourier spectrometry.

REVIEW OF THE RELATED TECHNOLOGY

Fourier spectroscopy is an established measuring method in the field of chemical analysis and optical remote sensing. The measuring device used is the Fourier spectrometer, whose essential optical assembly is an interferometer based on the classical Michelson design.

The radiation to be investigated is usually detected in the infrared spectral range. Applications involving detectors that are sensitive in the ultraviolet or visible ranges of the electromagnetic spectrum are also known. The output signal of the detector is usually an electrical voltage or an electrical current. The detector comprises a radiation-sensitive sensor and amplifying electronics for signal conditioning which are matched to the sensor (e.g., impedance matched).

The output of a Fourier spectrometer is the so called interferogram, which is the Fourier transform of a spectrum. The spectrometer detector output—an amplified, analog sensor signal—is supplied to a digitizing unit which converts the analog signal into a digital data stream. The data stream is further treated by a digital computer in a known manner, according to the principles of Fourier spectrometry, resulting in a data set representing a segment of the electromagnetic spectrum coupled into the Fourier spectrometer, in energy units, as a function of the wavelength or the wave number, that is, a spectrum.

Mercury-cadmium-telluride detectors represent a widely-used class of radiation sensors. The advantages of their spectral bandwidth and their spectral sensitivity profile, which can be set fairly flexibly in the manufacturing process, are offset by the drawback of the non-linearity of the electrical output signal of the detector as a function of the coupled-in optical power.

The detector non-linearity appears in the spectrum as a distortion, because the spectrum is calculated from the detector output signal (as the Fourier transform of the signal).

The term "detector non-linearity" covers not only the properties of the radiation sensor itself, but also those of the downstream analog amplifier electronics.

FIG. 1 shows an example of a spectrum recorded with conventional methods. The wave number $\sigma$ of the radiation is shown in units of $cm^{-1}$ (i.e., waves per cm) on the abscissa, and the radiation energy $S_m(\sigma)$ (i.e., intensity as a function of wave number) is shown in arbitrary units on the ordinate. The wave number $\sigma$ is proportional to frequency if the wave speed is constant.

It can be seen in the spectrum of FIG. 1 that some values of $S_m(\sigma)$, which lie outside of the sensitive spectral range of the detector is sensitive, exhibit energy values that are clearly higher than the spectral noise contribution in the system. In the example according to FIG. 1, this is the case in the wave number range $\sigma < 600$ $cm_{-1}$.

Detector non-linearities can arise in both the radiation sensor and the downstream analog amplifier electronics. Several methods are known for correcting detector non-linearities in Fourier spectroscopy. These known methods have disadvantages, however, that will be described below along with the known methods themselves.

First are methods for determining the transient response (spectral sensitivity, linearity) of the detector through absolutely-precise photometric calibration. One example is known from Zhang, Z. M., Zhu, C.J., Hanssen, L. M.: "Applied Spectroscopy," 51 (1997), pp. 576–579.

Such methods require a large outlay for measuring equipment, and must be applied individually to each detector. If the detector behavior drifts, the calibration must be repeated.

In addition, knowledge about the working point of the detector in the form of a constant-light component in the interferogram is necessary for correcting the detector signal with the aid of the calibration functions. However, many detector-amplifier units output a signal that has no constant-light component (because the constant-light component contains no usable information from the standpoint of spectroscopy).

A second method is to include electrical correction circuits for compensating the detector non linearity. These require additional electronic components, which increase the inherent noise of the electrical signal-detection chain, and therefore decrease the detection performance of the instrument. The correction circuits must be individually adapted to each detector, and cannot correct for drift or changes in the detector performance, for example due to aging.

A third known option for correcting the detector non-linearity involves the use of correction algorithms which are applied to the detector signal after it has been digitized. Such correction algorithms operate in a standard manner using Taylor series analysis. The measured interferogram $I_m$ is represented as a Taylor-series development of an ideal, distortion-free interferogram $I_i$:

$$I_m = I_i + \alpha I_i^2 + \beta I_i^3 + \ldots \quad (1)$$

Suitable methods, for example from U.S. Pat. No. 4,927,269 (which is entirely incorporated herein by reference), can be employed to approximate the ideal interferogram $I_i$.

For these algorithms knowledge of the constant light component $I_m$ is mandatory. Determination of characteristic parameters in the spectrum $S_m(\sigma)$ (such as, the spectral value at the location $\sigma=0$, or the area between the spectral function and the abscissa) are calculated from the measured interferogram $I_m$.

OBJECTS AND SUMMARY OF THE INVENTION

It is an object of the invention to provide a method for correcting detector non-linearities in Fourier spectroscopy, which does not require knowledge about the system parameters (transfer function, dynamic behavior) of the detector/amplifier assembly, does not require knowledge about the constant-light component, and requires no additional electronic components.

In the method of the present invention a spectrum is produced by Fourier-transforming an interferogram $I_m$ produced by a Fourier spectrometer (the subscript m stands for "measured"). Such a spectrum will include non-zero ordinates which lie outside of the sensitive spectral range ("out-of-band") of the spectrometer's detector; these non-zero ordinates appear as artifacts due to non-linearities in the response of the detector and/or the electronics.

The present invention synthesizes a distortion-free interferogram $I_s$ (subscript s for "synthesized") which is proportional to the ideal interferogram based on the measured interferogram $I_m$.

The synthesis is performed using orthogonal sets of functions, preferably powers, including $I_m^1, I_m^2, I_m^3 \ldots$. These functions are combined using weighting factors (coefficients), which are selected such, that the absolute values of the ordinates in the out-of-band regions of the spectrometer's detector are minimized. The method of the invention thus corrects for detector non-linearities in Fourier spectroscopy.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Figure 1:
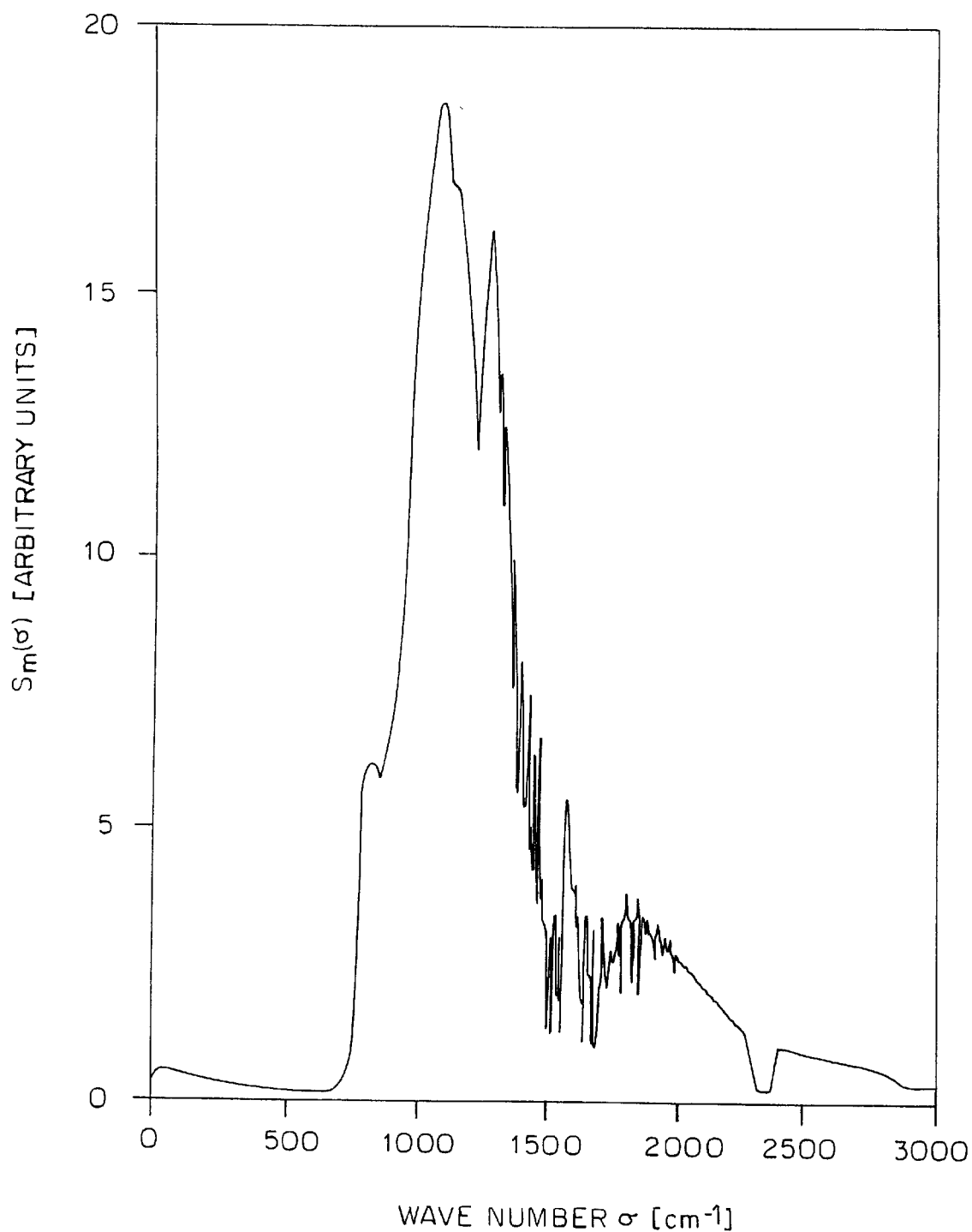
FIG. 1 is a graphical view of a spectrum with distortions due to detector non-linearities.

The method according to the invention synthesizes an unknown function $I_s$, which is proportional to the sought-after ideal interferogram $I_i$, from a series of orthogonal functions, based on the measured interferogram $I_m$. That is, $$I_s = f(I_m) \tag{2}$$

Preferably, $f(I_m)$ includes a finite series $I_s = \Sigma f_i(I_m)$, where the index i runs over a finite range of integers (e.g., 1 to N or 0 to N−1), and wherein all functions $f_i$ of the measured interferogram $I_m$ are mutually orthogonal.

A preferred set-up is a synthesis from polynomials of the form $$I_s = \sum_{i=0}^{N-1} a_i \cdot I_m^i \tag{3}$$

It is noted that the powers of $I_m$ comprise a set of orthogonal functions.

The number N and the values $a_i$ of the coefficients in Equation (3) are to be selected such that the synthesized interferogram $I_s$ represents an interferogram having the least-possible distortion. In accordance with the invention, the coefficients $a_i$ are advantageously determined with the use of the characteristic features of a distortion-free interferogram.

The synthetic spectrum So it a representation, in spectral space, that is equivalent to the synthesized interferogram $I_s$. That is, the synthetic spectrum $S_s$, a function of the wavelength or wave number, can be calculated in a known manner from the interferogram $I_s$ by performing a Fourier transformation, The synthetic spectrum $S_s$ cannot exhibit any spectral amplitude outside the spectral range of sensitivity of the detector, i.e., in the so-called detector "out-of-band ranges".

With the use of the set-up according to Equation (3), and in keeping with the laws of Fourier transformation, the synthetic spectrum $S_s$ can be represented as $$S_s(\sigma) = a_0 + a_1 FT(I_m) + a_2 FT(I_m^2) + a_3 FT$$

$$(I_m^3) + \ldots + a_{n-1} FT(I_m^{N-1}) = a_0 + a_1 S_m(\sigma) + a_2 S_m(\sigma) * S_m(\sigma) + a_3 S_m(\sigma) * S_m(\sigma) * S_m(\sigma) + \ldots, \tag{4}$$

where "*" stands for the convolution operation and FT( ) represents the Fourier transformation.

The coefficients $a_i$ are selected such that the following applies for the synthetic spectrum $S_s$: in one or more freely-selectable segments of the spectrum, which lie outside of the spectral range of sensitivity of the detector, $$S_s(\sigma) \stackrel{!}{=} 0 \tag{5}$$

The selected spectral segments need not be identical to the out-of-band ranges of the detector. It must only be ensured that all segments lie completely within these out-of-band ranges.

Because the number of available spectral locations in the selected spectral segments is significantly higher than the number N of coefficients $a_i$ to be determined, the method of Gaussian least squares fit is a preferred method for determining the coefficients.

The coefficients $a_1, a_2, \ldots$ of the expansion of the spectrum $S_s$ are adapted to yield the value of zero, as according to equation (5), at each of the available spectral locations in the selected spectral segments. This is accomplished in accordance with the criterion of the minimum sum of the quadratic deviations.

Figure 2:
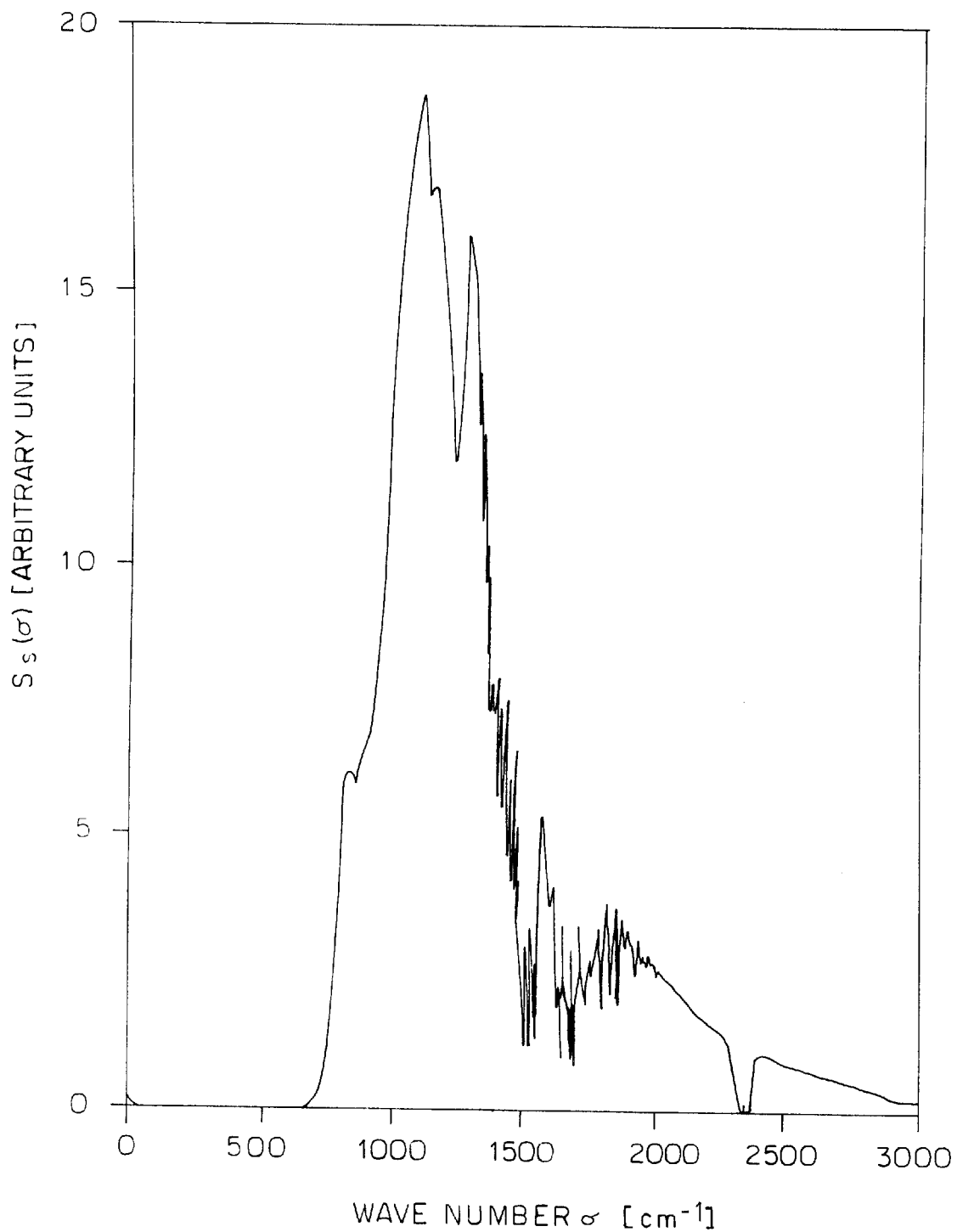
FIG. 2 is a graphical view of a spectrum with distortions due to detector non-linearities removed.

FIG. 2 shows the spectrum of FIG. 1 after correction according to the method of the invention. In FIG. 2 the wave number σ is again shown in $cm^{-1}$ on the abscissa, and the energy $S_s(\sigma)$ is shown in arbitrary units on the ordinate. Outside of the spectral range in which the detector is sensitive, that is, in the wave-number range σ<600 $cm^{-1}$, the spectrum shown in FIG. 2 exhibits no energy values (spectral components) above that to be expected from system noise, which is in contrast to FIG. 1, which shows spectral components in this range.

The correction method of the invention described above, in which the selected spectral segments are in the out-of-band ranges of the detector, can be expanded by the additional use of spectral ranges lying within the spectral range of sensitivity of the detector for the purpose of determining the coefficients; these additional ranges, however, are known to contain no energy components different from zero (a priori knowledge).

This is always the case, for example, when measurements when radiation passes through the atmosphere to the detector. Atmospheric gas components absorb all of the radiation in certain spectral ranges, the so-called total absorption; for example, carbon dioxide ($CO_2$) absorbs all radiation in the spectral range around 2350 $cm^{-1}$.

The method of the invention, as is seen in equations (3) and (4), provides a corrected interferogram $I_s$ and a corrected spectrum $S_s$, respectively. These are not identical to the ideal interferogram $I_i$ and the ideal spectrum $S_i$, respectively, but rather are proportional to the ideal interferogram $I_i$ and the ideal spectrum $S_i$, respectively: there is an undetermined proportionality factor c, such that $$I_s = c \cdot I_i$$

and $$S_s = c \cdot S_i \tag{6}$$

No knowledge about the factor c is necessary in absorption spectroscopy. Conventionally in absorption spectroscopy, the ratio of two spectra, namely the spectrum of the sample to be investigated and a reference spectrum, is formed and evaluated.

If the factors c of the two corrected spectra are not identical, then the quotient, that is, the so called transmission spectrum, exhibits a scaling error that can be determined and eliminated with the aid of known methods (the so-called "baseline correction").

It can be shown that the method of the present invention corrects detector non-linearity strictly with algorithms, and without additional electronics. The present method requires neither knowledge about the system parameters of the detector comprising the sensor and the amplifier electronics (transfer function, dynamic behavior), nor any knowledge about the constant-light component. Only an approximate knowledge about the spectral sensitivity interval of the detector is necessary.

The method of the invention ascertains and corrects the distortions automatically with each measurement, and therefore need not be individually adapted to different detectors or changing detector parameters.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to" and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A method for the spectroscopic investigation of electromagnetic radiation in the infrared spectrum by means of a Fourier spectrometer, whereby an interferogram is measured as the output signal of a detector comprising a sensor that is sensitive to the radiation to be detected, and amplifier electronics tuned thereto, in such a way that, through correction of a measured output signal $I_m$, which is distorted due to detector non-linearities, a distortion-free interferogram is approximated by synthesizing a signal $I_s$ that is proportional to the required distortion-free interferogram of the detector from a finite mathematical series of orthogonal functions in such a way that the function terms of said mathematical series are based on the distorted measured output signal $I_m$ of the detector in the form $I_s=f(I_m)$, characterized in that the determination of unknown coefficients $a_i$ takes place after Fourier transformation of the finite function series $f(I_m)$ in the spectral range in such a way that the resulting spectrum $S_s$, which represents the Fourier transform of the signal $I_s$ that is proportional to the required distortion-free interferogram of the detector, possesses, in the spectral ranges in which the radiation detector has no or only a negligible optical sensitivity, spectral values that are as close to the ideal value zero as possible.

2. The method according to claim 1, wherein the interferogram contains, in an encoded form, all information about the spectrum, and wherein the Fourier transform decodes the spectrum information.

3. The method according to claim 1, wherein a distortion-free interferogram $I_s$ is synthesized as a linear combination of orthogonal functions $f_i(I_m)$ comprising coefficients $a_i$, such that $I_s=\Sigma a_i f_i(I_m)$.

4. The method according to claim 3, wherein the coefficients $a_i$ are necessary for an unambiguous description of the synthesized interferogram $I_s$, are obtainable from knowledge about the optical radiation detector.

5. The method according to claim 3, comprising determining the coefficients $a_i$ according to a Fourier transformation of the finite function series $I_s=\Sigma a_i f_i(I_m)$ such that a resulting spectrum $S_s$, which comprises a Fourier transformation of the signal $I_s$, is substantially zero in a spectral range in which the radiation detector exhibits negligible optical sensitivity.

6. The method according to claim 5, comprising determining the coefficients $a_i$ according to a Fourier transformation of the finite function series $I_s=\Sigma a_i f_i(I_m)$ such that a resulting spectrum $S_s$, which comprises a Fourier transformation of the signal $I_s$, is substantially zero in an additional spectral range in which the radiation detector exhibits non-negligible optical sensitivity.

7. The method according to claim 6, wherein the additional spectral range is a range of total absorption.

8. The method according to claim 7, wherein the method comprises taking of measurements under atmospheric influence, and wherein the range of total absorption comprises a spectral range wherein atmospheric gas components absorb substantially all of the radiation led to the detector.

9. The method according to claim 3, wherein the functions $f_i$ comprise polynomials of the form $f_i=I_m^i$.

10. The method according to claim 9, characterized in that the unknown coefficients $a_i$ are determined by means of the method of Gaussian least squares fit.

11. A method according to claim 1, characterized in that the finite series of functions $f(I_m)$ is represented by a series of polynomials of the form $a_i I_m^i$ in such a way that the coefficients $a_i$ are determined.

12. A method according to claim 1, characterized in that the determination of the unknown coefficients $a_i$ is carried out with the linear Gaussian method of at least squares.

13. A method according to claim 1, characterized in that, in addition to the spectral ranges in which the radiation detector has no or only a negligible optical sensitivity, further spectral ranges are used for the determination of the coefficient $a_i$ in which no fraction of the radiation impinges on the optical radiation detector because of the spectrometric arrangement.

14. A method according to claim 13, characterized in that the additionally used spectral ranges are so-called ranges of total absorption.

15. The method of claim 14 wherein said ranges of total absorption comprise measurements performed under atmospheric influence, when the atmospheric gas components in known spectral ranges absorb the entire radiation to be guided to the detector.

* * * * *